April 7, 1959 — W. SETTELE — 2,880,518
INSTRUMENT FOR MEASURING INTERNAL TAPER THREADS
Filed June 12, 1957 — 2 Sheets-Sheet 1

Inventor
Wilhelm Settele
By [signature] Atty.

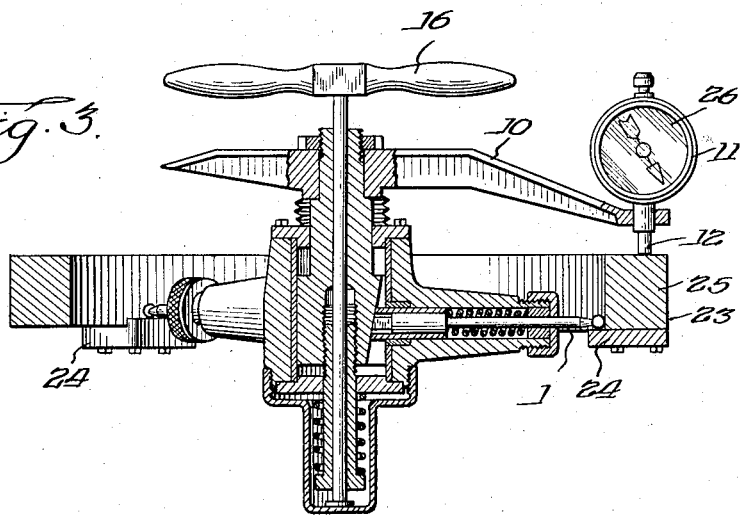
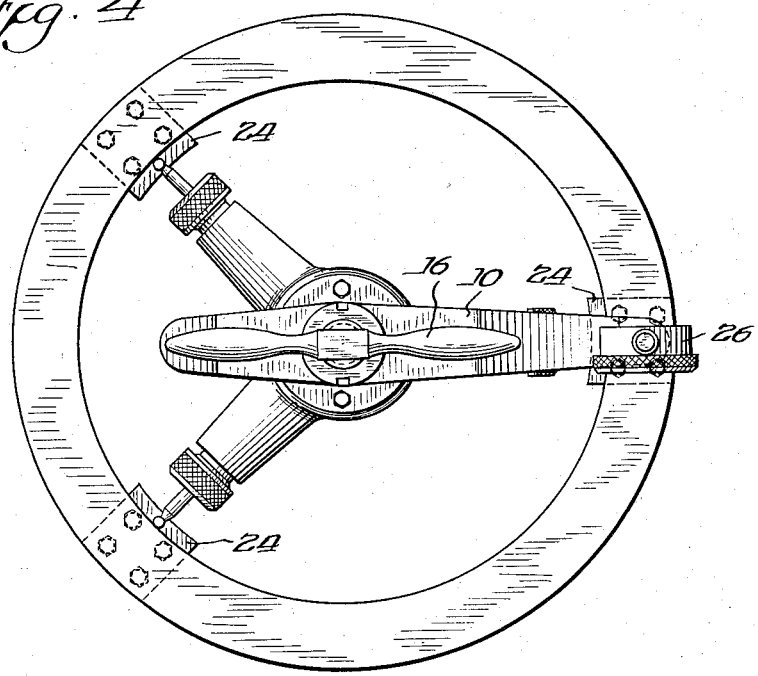

United States Patent Office 2,880,518
Patented Apr. 7, 1959

2,880,518

INSTRUMENT FOR MEASURING INTERNAL TAPER THREADS

Wilhelm Settele, Biberach, Germany, assignor to Siemens-Plania Werke Aktiengesellschaft fuer Kohlefabrikate, Meitingen, near Augsburg, Germany, a corporation of Germany Application June 12, 1957, Serial No. 665,271

Claims priority, application Germany July 12, 1956

3 Claims. (Cl. 33—199)

The present invention is concerned with an instrument for measuring or gauging internal taper threads, for use in workshops for the inspection of completely cut internal taper threads. The instrument according to the invention is particularly intended for the checking of threads of graphite electrodes.

Up to the present time, threads of this kind were checked by means of plug gauges. These gauges however are expensive, subject to wear, and do not permit objective measurement of the thread with respect to the diameter of the thread flank at a given distance from the end surface of the thread. It has already been proposed to take as basis for the determination of the flank diameter of taper threads a given distance of the thread from the end of the threaded body and to determine the flank diameter by calipers provided with measuring points and acting on dials, which calipers are supported on a base plate disposed on the end surface of the thread and forming the reference surface for the flank diameter. Such an instrument however is hardly suitable for shop use since it requires trained personnel to obtain dependable results.

The present invention proposes an easily operated manual instrument which can be used even by untrained personnel.

This advantage is achieved in accordance with the invention by the provision of a measuring instrument comprising three gauge pins arranged at an angle to each other and staggered in accordance with the thread pitch, these pins being under spring action and one end being arranged in the thread groove while the other end is placed against an oblique slide surface of a piston, under spring action, which is guided in the direction of the axis of the thread within the housing of the gauge pins, the piston operatively supporting a dial gauge which is fastened thereto and resting against the thread end surface as reference plane. The dial is set to the desired value by means of a setting gauge. The setting gauge comprises a ring, the ring surface of which forms the reference plane for the dial and has three measurement points incorporated for the three point measurement at different distances from the ring surface corresponding to the thread pitch. Upon insertion of the measuring instrument into the setting gauge or into the inner thread which is to be measured, the piston which is guided in the housing of the gauge pins and bears the gauge dial on an extension arm, is raised by means of a handle against the action of a spring so that the gauge pins which are under spring action slide down on the oblique surfaces of the piston and the diameter measured over the gauge pins is thereby correspondingly reduced.

The measuring instrument may in this way be conveniently inserted into the inner thread since the gauge pins after the elimination of the pressure exerted on the spring by the handle are pressed against the thread by the oblique surfaces of the piston. If the oblique surfaces milled into the piston have exactly the same angle as half the cone angle of the workpiece, there necessarily results for a given diameter a given distance from the end surface to the center of the gauge pins. If measurement is effected in different thread grooves, the three gauge pins are pressed together or spread apart by the conicity of the thread. As a result, however, the distance from the center of the gauge pins to the lever bearing the gauge dial is necessarily changed. If the cone angle of the threaded piece and the distance from the end surface of the thread to the plane of the diameter are precisely maintained, the gauge dial will always indicate the same value. If a deviation is noted, this proves that the diameter has not been maintained. If the diameter is too small, the thread must be further cut until the gauge dial indicates the prescribed value with respect to the reference plane. If the diameter is too large, the end surface must be planed off by the amount indicated on the gauge dial.

An embodiment of the invention is shown by way of example in the drawings in which, Fig. 1 is a sectional view through the measuring instrument inserted into the inner thread which is to be measured;

Fig. 3 is a sectional view of the measurement instrument inserted into the setting gauge; and Fig. 4 is a top view of the measurement instrument inserted into the setting gauge.

Figure 1:
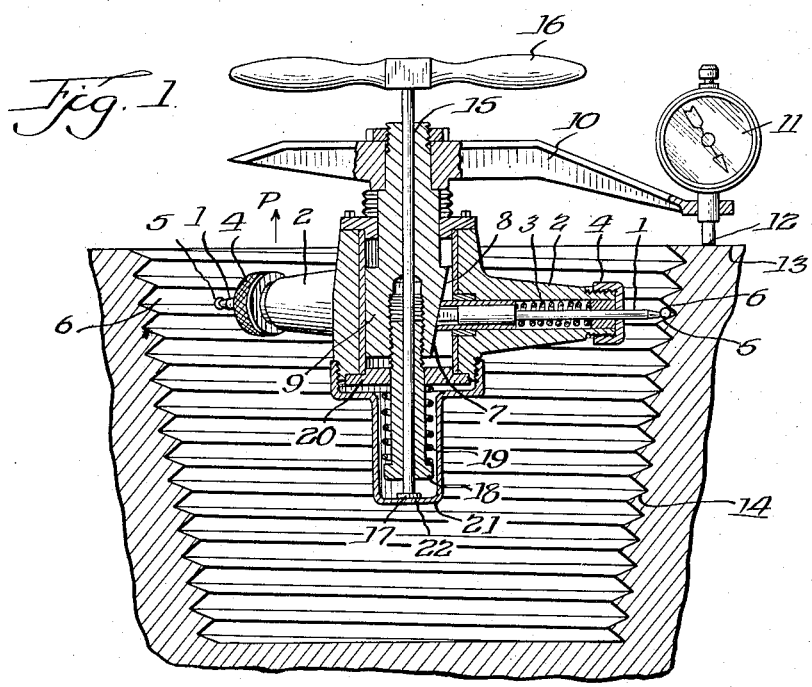
Figure 2:
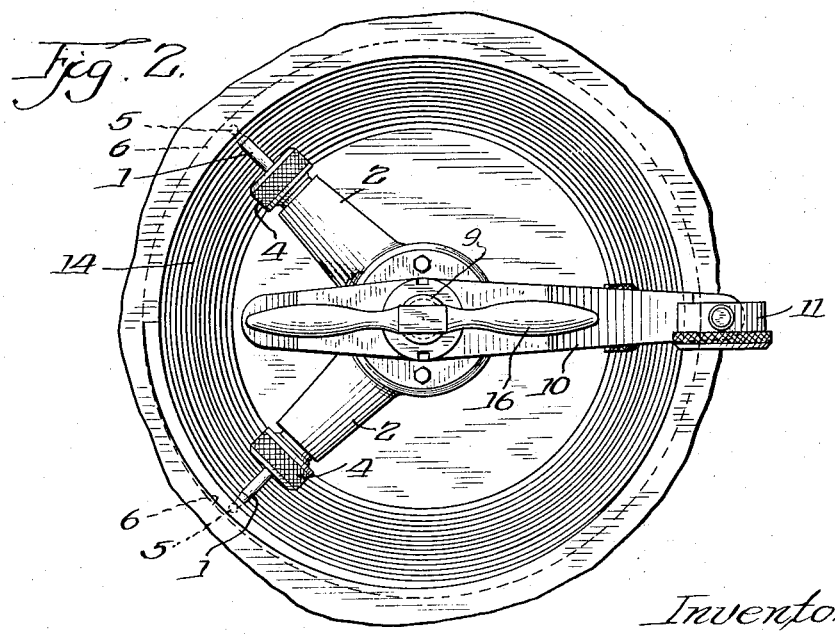
Fig. 2 is a top view of the measurement instrument.

The measurement instrument shown in Figs. 1 and 2 has three gauge pins 1 which are guided, arranged at an angle to each other, in a housing 2 and are each under the action of a separate spring 3, the springs resting against the corresponding gauge pins 1 and a bushing respectively associated therewith. The spring pressure may be adjusted by means of a threaded ring 4. Each gauge pin 1 has a spherical point 5 which is inserted into the thread groove 6 to be measured, while the other end of the gauge pin 1 is provided with an oblique surface 7 in engagement with an oblique surface 8 of a piston 9 which is guided in the direction of the thread axis in the housing 2. This piston 9 is provided on a part thereof extending out of the housing 2, with an extension arm 10 to which the measuring dial 11 is fastened. The gauge pin 12 which acts on the measuring dial 11 rests against the end surface 13 of the threaded body 14 to be gauged. Through a bore 15 in the piston 9 passes a pull rod 17 provided with a handle 16. Into the lower part of the piston 9 there is threaded a bushing 18 against which a compression spring 19 rests; the other end of such spring resting against the cover plate 20 which is rigidly connected with the housing 2. The spring 19 is covered by a protective cap 21 which also determines the end position of the rod 17. The rod 17 is provided at its end with an enlargement 22 which upon the lifting of the handle 16 comes against the bushing 18 so that the spring 19 is compressed responsive to raising of the handle 16. At the same time, the piston 9 is moved in the direction indicated by the arrow P. Since the oblique surface 9 is thereby moved upward, the gauge pins 1 which are under the action of the springs 3 slide inward so that the diameter characterized by the three gauge pins is reduced. The raising of the piston 9 by the handle 16 takes place upon the insertion of the measurement instrument into the thread. Upon cessation of the pulling force on the handle 16, the piston 9 is moved by the spring 19 in the direction opposite the direction indicated by the arrow P and the gauge pins 1 are pressed against the thread. In this position, the gauge dial 11 indicates the deviation of the measured taper diameter of the thread flank at a given distance from the end surface 13 of the threaded body since the dial gauge has previously been set to the proper value by means of the setting gauge shown in Figs. 3 and 4.

The setting gauge is formed of an annular body 23 provided with three measurement positions 24 formed thereon which are so staggered in height with respect to the annular surface 25 that the gauge pins 1 rest against the inner surface of the gauge body 23 in a manner corresponding to the pitch of the thread. By the displacement of the setting scale 26, the gauge dial 11 is set to indicate zero. By lifting the handle 16, the measuring instrument which has thus been set is removed from the setting gauge and can now be inserted into the inner thread which is to be measured, as already explained. The deflections of the gauge dial will then indicate the amount by which the diameter of the thread at a given distance from the end surface of the workpiece is too large or too small.

Changes may be made within the scope and spirit of the appended claims.

I claim:

1. An instrument for measuring internal taper threads comprising three gauge pins disposed at an angle to each other and displaced in height from each other by an amount corresponding to the thread pitch, spring means for biasing said gauge pins, a piston having oblique surfaces formed thereon, each gauge pin having one end thereof adapted to rest in a thread groove and the other end against an oblique surface of said piston, spring means for biasing said piston in the direction of the thread axis, and a gauge dial having its gauge stem resting on an end surface of a threaded body being gauged, said piston operatively supporting said dial.

2. An instrument according to claim 1, wherein said piston has a bore formed therein, a pull rod extending through said bore, and a handle for said rod, whereby said rod and therewith said piston can be raised against the action of the spring acting on said piston for the purpose of permitting said gauge pins to move with respect to the oblique surfaces formed on said piston.

3. An instrument according to claim 1, wherein the spring force acting on said piston is greater than the spring forces acting on said gauge pins.

References Cited in the file of this patent

UNITED STATES PATENTS

| | | |
|---|---|---|
| 1,879,398 | Mirfield | Sept. 27, 1932 |
| 2,448,106 | Mannerbrink et al. | Aug. 31, 1948 |
| 2,630,633 | Webb | Mar. 10, 1953 |
| 2,735,187 | Grobey | Feb. 21, 1956 |

FOREIGN PATENTS

| | | |
|---|---|---|
| 113,536 | Great Britain | Feb. 28, 1918 |